United States Patent Office 3,630,960
Patented Dec. 28, 1971

3,630,960
ORGANIC PEROXIDE ENOLIZABLE KETONE COMPOSITIONS
Edward Chetakian, Anaheim, Calif., assignor to The Norac Company, Inc., Azusa, Calif.
No Drawing. Continuation-in-part of applications Ser. No. 732,077, May 27, 1968, and Ser. No. 831,720, June 9, 1969, the latter being a continuation-in-part of application Ser. No. 732,078, May 27, 1968, and with said Ser. No. 732,077 is a continuation-in-part of application Ser. No. 447,547, Apr. 12, 1965, now Patent No. 3,398,213, application Ser. No. 447,547 being in turn a continuation-in-part of application Ser. No. 50,308, Aug. 18, 1960. This application Apr. 27, 1970, Ser. No. 32,339
Int. Cl. C08f 21/00
U.S. Cl. 252—426
24 Claims

ABSTRACT OF THE DISCLOSURE

Compositions of hydroperoxides, ketones peroxides and peresters with B-diketones and derivatives of acetoacetic acid are useful low hazard initiators for polymerization.

ORGANIC PEROXIDE ENOLIZABLE KETONE COMPOSITIONS

This application is a continuation-in-part of applications Ser. No. 732,077, filed May 27, 1968 and now abandoned, and Ser. No. 831,720, filed June 9, 1969. The latter was a continuation-in-part of application Ser. No. 732,078, filed May 27, 1968 and now abandoned, and with Ser. No. 732,077 was a continuation-in-part of Ser. No. 447,547, filed Apr. 12, 1965 and U.S. Pat. 3,398,213, which in turn was a continuation-in-part of Ser. No. 50,308, filed Aug. 18, 1960 and now abandoned. Each application was copending with the former application.

This invention relates to new polymerization initiator compositions.

The instant invention involves the discovery that readily enolizable ketones, that is, ketones that exist in an appreciable concentration in the enol form under the conditions of polymerization, when combined with organic peroxides that undergo the redox reaction with metal salts, give compositions with reduced hazard and increased activity as polymerization initiators.

The redox initiated polymerization of vinyl monomers by a soluble salt of a redox active metal and an organic peroxide or peroxide compound is of great commercial important today. It has been found to be particularly useful where it is desired to carry out polymerizations at room or moderate temperature since common organic peroxides homolyze too slowly at these tempratures to be effective. The redox process therefore is particularly useful with those monomer systems that have relatively high rates of polymerization at room temperature. Such processes have wide commercial application in the laminating field, particularly when employed with the "unsaturated polyester resins" of commerce and related materials. Room and moderate temperature applications are not the only areas where these processes have been found to be useful. In match metal die molding, the use of a redox process permits the tailoring of a peroxide's decomposition rate to the particular application conditions and also permits the use of less expensive and higher stability peroxides.

In the redox polymerization initiation process, as commonly employed at room temperature, a ketone peroxide such as methyl ethyl ketone peroxide or cyclohexanone peroxide is added to a monomer, such as an unsaturated polyester resin, containing a soluble salt of a reactive metal such as manganese octoate or cobalt naphthenate (in a few applications the order of addition of metal salt is reversed). The redox reaction between the metal ion and the peroxide produces free radicals which react with the monomer and initiate the polymerization. In an elevated temperature application, an organic perester such as tert-butyl perbenzoate is added to a cobalt containing polyester resin and cured in a matched metal die at about 250 F. In another application, a cobalt containing monomer such as methyl methacrylate can be polymerized at elevated temperatures under pressure or as a suspension in water with 2,5-dimethyl-2,4-dioctoylperoxyhexane as the peroxide.

The enolizable ketones are true synergists with the reactive metals in the redox polymerization initiation. Thus, while by themselves, the enolizable ketones are compatible with the organic peroxides employed and have little influence on the rate of polymerization initiation except with peresters, a large acceleration of rate is observed in combination with the reactive metal in the redox process. The advantages from the process are many. The marked acceleration in rate of polymerization initiation makes possible more rapid processing with resulting cost reduction, a reduction in the amount of peroxide or of redox reactive metal salt required. A reduction in peroxide employed gives a saving in cost. A reduction in metal concentration reduces the color level of the final product since many of the salts are highly colored. The enolizable ketones also reduce the level of the color present. The acceleration of the redox reaction also permits the use of peroxides that would be too slow otherwise. This gives the formulator the option of selecting less expensive peroxides or ones that are more stable and easily handled. This is particularly true with the use of peresters in high temperature applications. Controlling the rates of initiation permits the tailoring of the rate to the application.

The enolizable ketones are extraordinary in that they have the advantage that they can be added to the peroxide compound prior to its addition to the vinyl monomer. Most promoters react vigorously or explosively with peroxides. Enolizable ketones also can be added to the monomer, such as the polyester resin, prior to the addition of the peroxide or for short periods the peroxide and monomer can be combined and the reactive metal salt added as a solution in the enolizable ketone. It makes no difference with which component the enolizable ketone is added as far as the final outcome of the reaction. Currently it is the practice of the polyester resin industry to add the promoters, which include the reactive metal salts, and the enolizable ketones at the time of manufacture of the resin. There is an advantage, however, in adding the enolizable ketone in combination with the peroxide compound. It is well known in the industry that many peroxide compounds and particularly organic peroxides are hazardous to handle and store. A great deal of effort currently is being expended in the industry to decrease the hazard of organic peroxides. It is an unusual fact that while the enolizable ketones are accelerators for the redox reaction they are very effective stabilizers or phlegmatizers for organic peroxides. This is particularly true for stabilizing the ketone peroxides, the hydroperoxides and the peresters against explosive decomposition.

The combination of organic peroxides and enolizable ketones is not only a convenient way to handle the enolizable ketones but provides much greater safety in handling the peroxides as herein described. All combinations are possible. Thus the peroxide and enolizable ketone can be liquids and miscible or one can be a solid and soluble or a mixture of solids. The stabilization to explosive decomposition is greater than one would expect from simple dilution and thus the chemical structure is important. The boiling point also has some influence, 2,4-pentanedione and the lower alkyl acetoacetates are particularly effective. Any dilution of the peroxide reduces the hazard but ratios of 0.5–9.5 to 8–2 enolizable ketone to organic peroxide are preferred from the economical handling and most commercial formulations are from 1–9 to 5–5 in order to match initiation requirements. From an activity consideration, ratios as wide as from 99–1 to 0.03–99.97 are easily demonstrated to be beneficial.

Two broad classes of closely related readily enolizable ketones have been found to be particularly useful in this process. The first and currently most useful class of easily enolizable ketones are the B-diketones. Although activity varies considerably from compound to compound the broad class has been found to be active wherein the substitutions are on the 1 and 5 position. Thus whether the substituent is an aryl substituent such as dibenzoylmethane, an alkyl group such as dipivaloylmethane, mixed aryl alkyl such as benzoylacetylmethane or cyclic such as 1,3-cyclohexanedione activity has been noted in all cases. Cyclic compounds with alkyl substitution on the rings have good activity. Thus 5,5-dimethyl-1,3-cyclohexanedione is highly active. Other active compounds are: acetylpropionylmethane, acetylbutyrylmethane, dipropionylmethane, benzoylpropionylmethane, acetylisobutyrylmethane, acetylcyclohexanecarboxoylmethane and indandione(1,3). Mono-substitution on the 2 position such as in 2-acetylcyclohexanone is operable but di-substitution is not (will not enolize). The second class of readily enolizable ketones that has been found to have high activity comprises the derivatives of acetoacetic acid which can be considered a special case of B-diketones. The esters and particularly the methyl and ethyl esters of acetoacetic acid are particularly useful since they are reasonably active and they are readily available commercial compounds. In addition the propyl, butyl, benzyl, cyclohexyl and isopropyl esters all function well. Alkyl, cycloalkyl and aralkyl esters, unsubstituted with reactive groups that would interfere with the polymerization process, are all useful. Esters of other acylacetic acids such as ethyl benzoylacetate are also active.

The enolizable ketones can be represented graphically as follows:

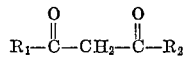

$R_1$ and $R_2$=alkyl, cycloalkyl, aryl, alkaryl

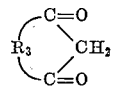

$R_3$=o-phenylene, trimethylene, B,B-dimethyltrimethylene

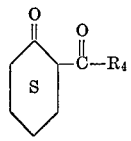

$R_4$=alkyl

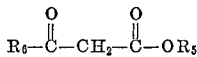

$R_5$=alkyl, cycloalkyl, aralkyl
$R_6$=phenyl, methyl

While some higher molecular weight enolizable ketones are quite active such as benzoylacetyl methane, in general the higher the molecular weight, the lower the relative concentration of the active structure (B-diketone) and thus the lower the activity. This is especially true of the esters of acetoacetic acid. In all cases, functional derivatives that interfere with the polymerization process should not be employed.

The exact mechanism of the process by which the enolizable ketones accelerate and/or increase the efficiency of the redox reaction is not known nor understood. That this is a very complex system is shown by the fact that optimum synergism is observed at a somewhat larger concentratioin than the stoichiometric ratio of the enolizable ketone and the redox reactive metal to form a chelate. A large response is observed by the addition of 2,4-pentanedione to a system containing cobalt acetylacetonate and employing a ketone peroxide.

An unexpected discovery has been the acceleration of the perester initiation of polymerization in the presence of enolizable ketones and in the absence of a detectable amount of a redox reactive metal. The effect is quite general for all of the enolizable ketones, primarily the B-diketones and the acetoacetates and is related to the general activity of the enolizable ketone with the redox process and the perester. The fact that enolizable ketones are active with peresters in the absence of a redox metal salt and roughly equivalent to the activity of the metal salt alone throws further doubt on a simple mechanism, once thought to be related to chelation. An explanation is further complicated by the fact that the effect so far is limited to peresters, although quite general with peresters. All peresters are active with the synergistic redox system and also active in this process. The ketone peroxides, surprisingly have not shown an equivalent activity.

The amount of enolizable ketone based on monomer required to produce an effective response in polymerization initiation varies from compound to compound but in general is in the range of 0.001 to 5% with optimum acceleration usually in the range of 0.05 to 2%.

The term "readily enolizable ketone" or "enolizable ketone" as employed herein refers to the B-diketones and derivatives of acetoacetic acid described above which exist in an appreciable concentration in the enol form in the resin or monomer.

All peroxides that undergo the normal redox reactions with the reactive metal salts have been found to be active in the instant invention. Among the principle classes of organic peroxides that are active, are the hydroperoxides, hydroxy and hydroperoxy peroxides derived from ketones and aldehydes and organic peresters. Acyl peroxides and dialkyl peroxides have not been found to be active in the instant process. The terms relating to various commercial peroxides are used in the common sense of commerce. Thus cyclohexanone peroxide refers to the material commonly sold as cyclohexanone peroxide in commerce and is in fact a mixture of several of the polymers of cyclohexanone peroxide. The bis-(1-hydroxycyclohexyl) peroxide also prepared from cyclohexanone is referred to by the chemical name by which it is known commercially. The term methyl ethyl ketone peroxide as used herein refers to the commercial 60% solution in dimethyl phthalate in which concentration it is relatively safe to handle. Methyl ethyl ketone peroxide is also a mixture of several compounds. Tert-butyl peracetate is normally handled in a diluent, usually a mineral spirits. Various inert diluents may thus be present in instant compositions together with the organic peroxide and easily enolizable ketone. These inert diluents do not affect the properties of the compositions as polymerization initiators except as diluents. The concentration of the inert diluent can often be reduced substantially or entirely replaced where appreciable quantities of the enolizable ketones are employed.

Compositions of ketone peroxides with enolizable ketones are particularly active and therefore useful. The term herein used as refers to the functional (hydroperoxy, hydroxy) monomers and polymers of carbonyl compounds that are used in commerce and are active in the redox process. These compounds may exist in many forms. Illustrative of the many types of ketone peroxides that can exist and are operative are the dihydroxy peroxides such as 3,5-dimethyl-3,5-dihydroxy-1,2-peroxycyclopentane from 2,4-pentanedione and bis(1-hydroxycyclohexyl) peroxide from cyclohexanone, a hydroxyhydroperoxide, 1-hydroxy-1'-hydroperoxycyclohexyl peroxide and a dihydroperoxyperoxide, bis(1-hydroperoxycyclohexyl) peroxide both also from cyclohexanone. Methyl ethyl ketone peroxide can exist as a dimer, trimer, or tetramer. These peroxides are not only derived from simple ketones and diketones but can as well be derived from aldehydes or ketoesters. Thus the hydroperoxy-hydroxy compound derived from heptaldehyde or ethyl 3-hydroxy-3-hydroperoxybutyrate derived from ethyl acetoacetate function equally well. Illustrative of other ketone peroxides that function well are peroxides prepared from methyl heptyl ketone, methyl amyl ketone, methyl isobutyl ketone, methyl butyl ketone and diethyl ketone. 2,4-pentanedione and the alkyl acetoacetates are especially useful with the ketone peroxides since they are good solvents, relatively inexpensive, and active as synergists and phlegmatizers. It was especially noted that 2,4-pentanedione produces a strong synergism with 3,5-dihydroxy-3,5-dimethyl-1,2-peroxycyclopentane. The ketone peroxides can be represented graphically as follows:

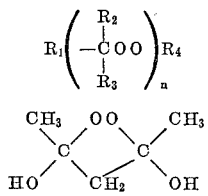

$n = 1-4$
$R_1 = OH, OOH$
$R_2 = $ lower alkyl
$R_3 = $ hydrogen, lower alkyl, alkoxycarbonyl
$R_2R_3 = $ pentamethylene
$R_4 = $ hydrogen

The perester-enolizable ketone compositions give promise of being the most commercially useful of the peroxide-enolizable ketone compositions. The combination not only gives a product with a substantial reduction in hazard but at the same time permits the tailoring of the activity as a free radical polymerization initiator in a way never before possible with organic peresters. While cobalt salts have been employed in the past to reduce the initiation temperature of peresters, the effect was not as marked as that of cobalt and related metals with the ketone peroxides. Now by the use of the enolizable ketones, the rate is increased sufficiently to make it of major importance. Thus 2,4-pentanedione increases the rate of initiation of polymerization by peresters over four times that obtained with cobalt alone. Where cobalt is detrimental, 2,4-pentainedione in the absence of cobalt increases the activity of peresters to approximately that obtained by cobalt alone. 2,4-pentanedione is the most generally useful enolizable ketone with benzoylacetyl methane and dibenzoylmethane also highly active. The esters of acetoacetic acid and benzoylacetic acid are also useful phlegmatizers as well as activators. Compositions of peresters with N,N-dialkyl-acetoacetamides particularly the dimethyl and diethyl, are low in hazard and stable. Similar compositions with ketone peroxides are not stable. All B-diketones are active as described elsewhere. All commercial tert-talkyl and related peresters have been found operative in this process and useful in instant compositions. Examples are:

tert-butyl perbenzoate,
tert-butyl per-2-ethylhexanoate,
tert-butyl perlaurate,
2,5-dibenzoylperoxy-2,5-dimethylhexane,
2,5-di-p-toluoylperoxy-2,5-dimethylhexane,
2,5-di-2-ethylhexanoylperoxy-2,5-dimethylhexane,
2,5-dioctanoylperoxy-2,5-hexane,
2,7-dibenzoylperoxy-2,7-dimethyloctane,
2,7-di-2-ethylhexanoylperoxy-2,7-dimethyloctane,
tert-butyl peracetate,
tert-butyl percrotonate,
tert-amyl per-2-ethylhexanoate,
tert-butyl perpivalate,
di-tert-butyl perphthalate,
tert-butyl percyclohexylcarboxylate,
2-(2-ethylhexanoylperoxy)-5-hydroperoxy-2,5-dimethylhexane.

Useful are tertiary alkyl peresters of both mono and dihydroperoxides and mono and di-basic acids. Mixed peroxides such as mono perester of a tertiary-alkyl dihydroperoxide are also active. In the peresters the acyl group can be derived from alkyl, aryl, simple aralkyl or cycloalkyl carboxylic acids. The common peresters can be represented graphically as follows:

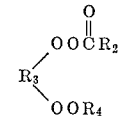

$R_1 = $ tertiary-alkyl
$R_2 = $ alkyl, cycloalkyl, aryl, aralkyl, propenyl
$R_3 = $ di-tertiary substituted alkane
$R_4 = -H$, While enolizable ketones substantially reduce the explosive hazard of the perester, at the same time they increase the rate of decomposition. Therefore, perester-enolizable ketone compositions may require refrigeration if the perester is highly active. The ratio of components that shows activity is quite broad as discussed previously. However, common commercial compositions usually range from 0.5–9.5 to 5–5 parts by weight enolizable ketone to perester.

Hydroperoxide-enolizable ketone compositions are useful as reporter for ketone peroxides. However, since the activity is not as great as with the ketone peroxides, their use is more restricted. Organic hydroperoxides that have found application in the instant compositions are cumene hydroperoxide, p-isopropylcumene hydroperoxide, tert-butyl hydroperoxide, 2,5-dihydroperoxy-2,5-dimethylhexane, 2,7-dihydroperory-2,7-dimethyloctane, tert-amyl hydroperoxide and p-menthane hydroperoxide. All are tertiary alkyl, tertiary aralkyl, or tertiary cycloalkyl hydroperoxides, as follows:

$$R_1OOH$$

$R_1 = $ tert-alkyl, tert-cycloalkyl or tert-aralkyl $R_2(OOH)_2$ $R_2$ is ditertiary-substituted alkane The term tert-alkyl hydroperoxide as used herein refers to those tert-alkyl, tert-aralkyl and tert-cycloalkyl hydroperoxides and dihydroperoxides employed in free radical polymerization initiation.

The amount of the peroxide-enolizable ketone compositions employed in polymerization initiation varies from composition to composition. However, based on the resin or the monomer, the concentration is in the general range of 0.05–3% based on peroxide or 0.05 to 6% of total composition, usually from 0.1 to 3%.

Of the redox reactive metals salts (which are also driers), cobalt, manganese, nickel and molybdenum salts are particularly effective with cobalt, the most generally useful metal. Several of the rare earths also exhibit some activity, namely, eruopium, praseodymium and ytterbium. The above metals in the form of their salts are all generally active with systems employing hydroperoxides and ketone peroxides. Activity with systems employing peresters is more selective with cobalt, molybdenum and ytterbium salts giving the largest response. The naphthenates and octoates are the salts most commonly employed but the acetylacetonates are also employed. The object being to employ salts that are compatible with the non-aqueous system. The redox reactive metal is effective over a wide range. When a cobalt salt is employed, for instance, concentrations are of the same order as those employed commercially or from 0.0001%–0.1% by weight cobalt metal.

The term redox reactive metal as used herein refers to those metals whose soluble salts have been found to have activity.

The present invention is effective with all ethylenically unsaturated monomers and resins that polymerize by a free radical mechanism. As stated before, it is particularly useful with those monomers and resins that polymerize at a reasonable rate at room temperature. It therefore has found its greatest application with the unsaturated polyester resins and related materials. "Unsaturated polyester resins" is the term commonly used today to designate a class of resins composed of an alkyd (polyester) resin containing unsaturated sites usually derived from maleic, fumaric or itaconic acid and a vinyl or allyl monomer such as styrene, methyl methacrylate, methyl acrylate, divinylbenzene, chlorostyrene, p-methylstyrene, diallylphthalate, diallyl maleate, triallyl cyanurate and others. The class is characterized by its very high rate of polymerization at room temperature or only slightly elevated temperatures. The rate of polymerization of the compositions in which the allyl radical is involved is somewhat slower than many of the compositions containing the vinyl monomers. Elevated temperatures are often required when the allyl monomers are employed. In addition to resins with the simple alkyd resin backbone, a large number of resins are now being produced by various manufacturers with different structures or backbones in order to obtain increased resistance to chemicals and other special properties. These resins also exhibit a high rate of polymerization at room or slightly elevated temperatures and are used in similar applications to unsaturated polyester resin. The term "unsaturated polyester resins" as used herein in the specification and claims is meant to encompass not only the strict sense of a polyester backbone but include all of those structures that have similar characteristics both in initiation and polymerization and are thus indistinguishable except by degree from the resins with an unsaturated polyester backbone. That their characteristics are similar as a class is well recognized in the art. Examples 1 and 2 give the formulation of typical "unsaturated polyester resins." The term "unsaturated polyester resin" is often shortened in use today to just "polyester resin" or even "polyester." It is realized that this is not in accord with strict chemical nomenclature, but these terms are used herein in their common-usage sense since the class of materials they represent are well known by these terms in the art. The present invention is also very effective with vinyl monomers such as methyl methacrylate, methyl acrylate, p-methylstyrene, chlorostyrene, vinyl acetate, diallylphthalate and styrene.

The term bulk polymerization is used to refer to mass polymerization such as is employed in the casting of polyester rods, laminating with fiberglass as in the manufacture of boats, casting of lamp bases in which water is emulsified in the resin, casting of sheets of polymethyl methacrylate, the preparation of polystyrene beads by polymerization of styrene suspended in water to control temperature. In other words, polymerization in which the monomer and polymer remain together in a single phase.

Organic peroxide compositions often contain in addition to the organic peroxide an inert diluent and some water and hydrogen peroxide. Organic peroxide-enolizable ketone compositions will as a result often contain these same materials as well.

EXAMPLE 1

To samples of a typical "unsaturated polyester resin" prepared as follows:

65% alkyd (polyester) resin acid No. 45–50 prepared from 1 mole maleic anhydride, 1 mole phthalic anhydride and 2.2 moles propylene glycol.

35% styrene plus 0.13% hydroquinone, and 0.03% cobalt as cobalt naphthenate and containing varying amounts of 2,4-pentanedione was added 1% methyl ethyl ketone peroxide at 25° C. as follows:

| 2,4-pentanedione, percent | Gel time, min. | Cure time,* min. |
| --- | --- | --- |
| 0 | 28 | 124 |
| 0.001 | 26.5 | 113 |
| 0.01 | 25 | 103 |
| 0.05 | 23 | 88 |
| 0.10 | 17.5 | 64 |
| 0.20 | 12.7 | 52 |
| 0.40 | 8.2 | 35 |
| 0.80 | 7.1 | 35 |
| 1.60 | 6.0 | 64 |
| 2.40 | 7 | 113 |
| 3.20 | 8 | 163 |
| 4.80 | 9.5 | 186 |

*Cure time as given in these examples is the time for a thin section to reach 10 on the Barcol 935 Impressometer.

EXAMPLE 2

To samples of a typical chemical resistant "double promoted resin" prepared as follows:

70% of an alkyd (polyester) resin prepared from 1 mole maleic anhydride 1 mole phthalic anhydride and 2.1 moles bisphenol A.

30% of styrene plus 0.013% hydroquinone and 0.03% cobalt as cobalt naphthenate and 0.06% dimethyl aniline containing the following amounts of ethyl acetoacetate was added 1% methyl ethyl ketone peroxide 25° C. as follows:

| Ethyl acetoacetate, percent | Gel time, min. | Cure time, min. |
| --- | --- | --- |
| 0 | 20.5 | 80 |
| 0.05 | 19 | 73 |
| 0.10 | 20 | 71 |
| 0.20 | 19 | 64 |
| 0.4 | 16 | 47 |
| 0.8 | 13 | 35 |
| 1.6 | 10.5 | 15 |
| 3.2 | 7.5 | 15 |

EXAMPLE 3

Resin and method of Example 1.

1% methyl ethyl ketone peroxide, 20° C., 0.4% of additive, as follows:

Gel time, min.
Control _____ 57
2,4-pentanedione _____ 13
Ethyl acetoacetate _____ 42
2,3-butanone _____ 41
2,5-hexanedione _____ 58

EXAMPLE 4

Resin and method of Example 1.

1% methyl ethyl ketone peroxide, 23° C., 1% of additive as follows:

Gel time, min.
Control _____ 37
Methyl ethyl ketone _____ 50
Acetone _____ 40
Cyclohexanone _____ 40
Ethyl acetoacetate _____ 14
2,4-pentanedione _____ 7

EXAMPLE 5

The resin and method of Example 1.
1% methyl ethyl ketone peroxide, 22° C. as follows:

| Dibenzoylmethane, percent: | Gel time, min. |
|---|---|
| 0 | 49 |
| 0.10 | 40.5 |
| 0.30 | 29.0 |

EXAMPLE 6

The resin and method of Example 2.

| Dipivaloyl methane, percent | Gel time, min. | Temp. 25° cure* at 80 min. |
|---|---|---|
| 0 | 19 | 20 |
| 0.05 | 18.5 | 30 |
| 0.10 | 17.5 | 35 |
| 0.20 | 18.5 | 30 |

EXAMPLE 7

The resin and method of Example 1.
1% of organic peroxide 25° C. as follows:

| | Gel time, min. | |
|---|---|---|
| 2,4-pentanedione, percent | Bis(1-hydroxycyclohexyl-1) peroxide | Cyclohexanone peroxide |
| 0 | 67 | 40 |
| 0.05 | 15 | 27 |
| 0.10 | <12 | |
| 0.2 | <10 | 23 |
| 0.4 | 8 | 21 |
| 0.8 | 13 | 21 |
| 1.6 | 23 | 21 |
| 2.4 | 28 | 28 |
| 3.2 | 32 | 36 |
| 4.8 | 31 | 49 |

EXAMPLE 8

The resin and method of Example 1. 25° C. as follows:

| | Gel time, min. | |
|---|---|---|
| 2,4-pentanedione, percent | tert-Butyl hydroperoxide, (2%) | Cumene hydroperoxide, (1%) |
| 0 | >500 | 426 |
| 0.10 | >500 | 319 |
| 0.40 | 313 | 222 |
| 1.60 | 301 | 270 |
| 6.40 | 359 | 303 |

EXAMPLE 9

The resin of Example 1 but with the cobalt naphthenate concentration as specified below was combined with 1% 2,4-pentanedione and 1% methyl ethyl ketone peroxide as follows:

| 6% cobalt naphthenate, percent: | Gel time, min. |
|---|---|
| 0 | >360 |
| 0.01 | 240 |
| 0.02 | 120 |
| 0.05 | 55 |
| 0.10 | 15 |
| 0.2 | 7.5 |
| 0.5 | 4.5 | without 2,4-pentanedione

1% manganese naphthenate (6%)—10 hrs.
same with 1% ethyl acetoacetate—84 mm.

EXAMPLE 10

The resin and method of Example 1.
1% methyl ethyl ketone peroxide 28° C. as follows:

| Additive | Peak exotherm, °C. | Time to peak exotherm, min. |
|---|---|---|
| 0 | 160 | 43 |
| 0.4% ethyl acetoacetate | 167.5 | 31 |
| 0.4% 2,4-pentanedione | 175 | 15 |
| 0.4% 2,3-butanedione | 103 | 130 |

EXAMPLE 11

The resin and method of Example 1.
0.28% $H_2O_2$, 19° C. as follows:

| 2,4-pentanedione, percent | Gel time, min. | Cure time, min. |
|---|---|---|
| 0 | 8¾ | 171 |
| 0.01 | 7½ | 113 |
| 0.02 | 7½ | 77 |
| 0.05 | 7¼ | 27 |
| 0.10 | 7¼ | 18 |

0.45% $H_2O_2$

| Ethyl acetoacetate, percent | Gel time, min. | Cure time, min. |
|---|---|---|
| 0 | 6 | 107 |
| 0.5 | 5¾ | 21¼ |

EXAMPLE 12

To the resin of Example 1 but without cobalt naphthenate was added the following: 1% methyl ethyl ketone peroxide, 22° C.

| | 2,4-pentanedione, percent | Gel time, min. | Cure time, min. |
|---|---|---|---|
| Cobalt acetylacetonate: | | | |
| 0.132% | 0 | 14.5 | 66 |
| 0.132% | 0.2 | 7 | 22 |
| Cobalt naphthenate (6%): | | | |
| 0.5% | 0 | 20 | 115 |
| 0.5% | 0.2 | 6.5 | 22.5 |

EXAMPLE 13

The resin and method of Example 1, 23° C.

| 2,4-pentanedione, percent | Peroxide (1%) | Gel time | Cure time |
|---|---|---|---|
| 0.5 | Benzoyl peroxide | >24 hours | |
| 0.5 | 2,4-dichlorobenzoyl peroxide | >24 hours | |
| 0.5 | Di-tert-butyl peroxide | >24 hours | |
| 0.5 | Perlauric acid | 2¾ minutes tack free 10 minutes. | 18 hours Barcol 40. |
| 0 | Perlauric acid | 47 minutes tack free 10 hours. | >30 hours. |
| 0.5 | Methyl ethyl ketone peroxide | 8 minutes | 45 minutes. |

EXAMPLE 14

The resin and method of Example 1, 20° C. as follows:
2,4-pentanedione

| | Percent |
|---|---|
| (A) 0% 3,5-dimethyl-3,5-dihydroxy-1,2-peroxycyclopentane | 0.16 |
| (B) 0.5% 3,5-dimethyl-3,5-dihydroxy-1,2-peroxycyclopentane | 0.16 |
| (C) 0% ethyl 3-hydroxy-3-hydroperoxybutyrate | 1.0 |
| (D) 0.5% ethyl 3-hydroxy-3-hydroperoxybutyrate | 1.0 |

| | Gel time, min. | Cure time, min. |
|---|---|---|
| A | 57 | 45 |
| B | 11¼ | 13 |
| C | 6 | 27 |
| D | 6 | 8 |

EXAMPLE 15

(1) To the resin of Example 1 was added 1% methyl acetoacetate, after standing 1% methyl ethyl ketone peroxide was added.

Gel time—19 min.

(2) A mixture of 50% of methyl ethyl ketone peroxide and 50% methyl acetoacetate was made and after standing 2% was added to the resin of Example 1.

Gel time—18¾ min.

(3) A control of 1% methyl ketone peroxide with the resin of Example 1.

Gel time—43 min.
Temperature—23° C.

EXAMPLE 16

The following monomers containing 1% of cobalt naphthenate (6%) were treated as follows with 1% methyl ethyl ketone peroxide.

60° C.

| | Gel time, min. |
|---|---|
| Methyl methacrylate | 95 |
| Methyl methacrylate, plus 0.5% 2,4-pentanedione | 35 |

Room temperature (0.5% cobalt naphthenate)

| | Gel time hrs. |
|---|---|
| Methyl methacrylate | >48 |
| Methyl methacrylate plus 0.5% 2,4-pentanedione | 8 |

Heated at 105° C. for 4 hrs. and 20 min. then raised to 145° C.

| | Gel time |
|---|---|
| Vinyl toluene | 5 hrs. 10 min. |
| Vinyl toluene, plus 0.5% 2,4-pentanedione | 4 hrs. 50 min. |
| Styrene | 5 hrs. 50 min. |
| Styrene, plus 0.5% 2,4-pentanedione | 5 hrs. 20 min. |

EXAMPLE 17

A 50 ml. sample of a mixture of equal amounts of tert-butyl perbenzoate and 2,4-pentanedione were placed in an accelerated aging oven at 110° F. for a period of two months and the activity compared with a similar sample of tert-butyl perbenzoate aged for the same period. Resin of Example 1 containing 0.05% cobalt octoate (6%) at 185° F., 100 g. sample was used for comparison and 0.4% of initiator sample.

| Initiator | Time to peak exotherm, min. | Active oxygen content, percent | Color |
|---|---|---|---|
| 50/50 tert-butyl perbenzoate 2,4-pentanedione | 18½ | 49.2 | Very light yellow. |
| tert-Butyl perbenzoate | 46 | 97.1 | Do. |
| After 2 months aging: | | | |
| 50/50 tert-butyl perbenzoate 2,4-pentanedione | 23.8 | 58.5 | Do. |
| tert-Butyl perbenzoate | 55.2 | 97.1 | Deep yellow. |

EXAMPLE 18

The standard resin and method of Example 1 but containing the following metal salts instead of cobalt.

METHYL ETHYL KETONE PEROXIDE 2.5%

| Metal salt | Conc., percent | 2,4-pentanedione, percent | Gel time, min. | Cure time [1], min. |
|---|---|---|---|---|
| Vanadium naphthenate (5%) | 0.05 | 0 | 7.3 | 172 |
| Do | 0.05 | 2 | 5.0 | 87 |
| Molybdenum naphthenate (8%) | 0.05 | 0 | 283 | |
| Do | 0.05 | 2 | 51 | |
| Nickel acetylacetonate | 0.1 | 0 | >300 | |
| Do | 0.1 | 0.1 | 180 | |
| Vanadyl acetylacetonate | 0.1 | 0 | 37 | |
| Do | 0.1 | 0.1 | 22 | |
| Europium acetylacetonate | 0.1 | 0 | >300 | |
| Do | 0.1 | 0.1 | 97 | |
| Praseodymium acetylacetonate | 0.1 | 0 | >300 | |
| Do | 0.1 | 0.1 | (2) | |
| Control | 0 | 0 | >300 | |
| Do | 0 | 0.1 | >300 | |

[1] Time from gel to initial cure.
[2] Very thick at 300 minutes.

EXAMPLE 19

The standard resin of Example 1 was heated (100 g.) in a 185° F. bath with the concentration of metal salt, enolizable ketone and peroxy compound given below and the time to peak exotherm noted.

0.4% TERT-BUTYL PERBENZOATE

| Metal salt | Enolizable ketone | | Time to exotherm, min. |
|---|---|---|---|
| 0.0% | | 2,4-pentanedione: | |
| | | 0.0% | 130.6 |
| | | 0.1% | 125 |
| | | 0.15% | 71.6 |
| | | 1.0% | 41.6 |
| | | 5.0% | 32 |
| | Ethyl acetoacetate: | | |
| | 1.0% | 1.0% | 37.4 |
| | 1.0% | 0% | 91.4 |
| | 3.0% | 0% | 85.6 |
| | Acetylbenzoylmethane, 1.0% | | 92.8 |
| | Dibenzoylmethane, 1.0% | | 77.8 |
| | 5,5-dimethyl-1,3-cyclohexanedione, 0.25% | | 68.2 |
| | 1,3-cyclohexanedione, 0.25% | | 21.4 |
| Cobalt octoate (6%): | | 2,4-pentanedione: | |
| 0.05% | | 0.0% | 33.2 |
| 0.05% | | 0.01% | 25 |
| 0.05% | | 0.1% | 17 |
| 0.05% | | 1.0% | 9.0 |
| 0.05% | | 2.0% | 9.9 |
| 0.05% | | 5.0% | 10.0 |
| 0.05% | Ethyl acetoacetate | 3.0% | 27.2 |
| 0.05% | Acetylbenzoylmethane | 1.0% | 14.6 |
| 0.05% | Dibenzoylmethane | 1.0% | 17.4 |
| 0.05% | 5,5-dimethylcyclohexane-1,3-dione | 0.25% | 27.8 |
| 0.05% | 1,3-cyclohexanedione | 0.25% | 12.2 |
| Vanadium naphthenate (5%): | | | |
| 0.05% | 2,4-pentaedione | 0.0% | 16 |
| 0.05% | do | 0.1% | 13.2 |
| 0.05% | do | 0.2% | 12.6 |
| 0.05% | Ethyl acetoacetate | 3% | 14.0 |
| 0.05% | 5,5-dimethyl-1,3-cyclohexanedione | 0.25% | 14.6 |
| 0.05% | 1,3-cyclohexanedione | 0.25% | 9.4 |
| Molybdenum naphthenate, (8%): | | | |
| 0.05% | 2,4-pentanedione | 0% | 33 |
| 0.05% | do | 0.1% | 32.6 |
| 0.05% | do | 0.2% | 32.2 |
| 0.05% | do | 1.0% | 27.8 |
| 0.0% | 0.5% mthyl ethyl ketone perioxide, 2,4-pentanedione | 0% | 17.6 |
| 0.0% | do | 0.5% | 17.4 |
| 0.0% | do | 1.0% | 17.2 |
| 0.0% | 0.4% 2,5-dibenzoylperoxy-2,5-dimethylhexane, 2,4-pentanedione | 0% | 88.4 |
| 0.0% | do | 1.0% | 30.4 |
| Cobalt octoate (6%): | | | |
| 0.05 | do | 0.0% | 32.8 |
| 0.05 | do | 1.0% | 7.6 |
| | 0.4% 2,5-dioctanoylperoxy-2,5-dimethylhexane, 2,4-pentaedione | 0% | 68 |
| | do | 1.0% | 28.8 |
| 0.05% | do | 0.0% | 24.2 |
| 0.05% | do | 1.0% | 11.0 |
| | 0.4% 2,5-di-2-ethylhexanoylperoxy-2,5-dimethylhexane, 2,4-pentanedione | 0% | 30.2 |
| | do | 1.0% | 21.8 |
| 0.05% | do | 0.0% | 21.6 |
| 0.05% | do | 1.0% | 8.6 |
| Ytterbium acetylacetonate: | | | |
| 0.4% | do | 0% | 13.8 |
| 0.4% | do | 0.1% | 12.2 |

EXAMPLE 20

To a 500 g. portion of the polyester resin of Example 1 containing 0.05% of cobalt octoate (6%) was added 0.4% of tert-butyl perbenzoate and 1% 2,4-pentanedione and the mixture maintained at room temperature. Gelation occurred in 7 days.

EXAMPLE 21

A 50 g. portion of methyl methacrylate was heated at 185° F. with 0.4% of 2,5-di-2-ethylhexanoylperoxy-2,5-dimethylhexane with the following additives and the time to peak exotherm noted.

| Cobalt octoate (6%) | 2,4-pentanedione, percent | Time to peak exotherm, min. |
|---|---|---|
| 0% | 0 | 21.2 |
| 0.05% | 0 | 22.2 |
| 0.05% | 1 | 16.3 |

EXAMPLE 22

The term PVT test refers to a pressure vessel test developed in Holland by Dr. E. W. Lindeijer at the Technological Laboratory of the National Defense Research Organization and work with it in this country is described by O. T. Mageli et al., Ind. Eng. Chem. 56, 18 (1964). It consists essentially of a pressure vessel into which a sample is placed in a standard metal cup. On top is fitted a burst diaphragm calibrated for 100 p.s.i. On the side is a fitting into which discs having varying apertures can be inserted. Using a standard heating rate, the smallest aperture that can be tolerated without rupture of the burst diaphragm is determined for a given compound. The smaller the aperture, the less hazardous the compound.

| Initiator: | PVT, minimum orifice to pass, min. |
|---|---|
| Tert-butyl perbenzoate | 5 |
| Plus— | |
| 2,4-pentanedione, 50/50 | 1½ |
| Methyl acetoacetate, 75/25 | 4 |
| Ehtyl acetoacetate, 80/20 | 3 |
| Butyl acetoacetate, 90/10 | 4 |
| Ethyl benzoylacetate, 50/50 | 1½ |
| N,N-dimethylacetoacetamide, 75/25 | 3½ |
| Tert-butyl per-2-ethylhexanoate | 5 |
| Plus— | |
| 2,4-pentanedione, 50/50 | 1 |
| Methyl acetoacetate, 50/50 | 1 |
| 2,5-dioctanoylperoxy-2,5-dimethylhexane | 8 |
| Plus— | |
| 2,4-pentanedione, 50/50 | 1 |
| Butyl acetoacetate, 50/50 | 1 |
| Di-tert-butyl diperphthalate | 18 |
| Plus 2,4-pentanedione, 50/50 | 3 |
| Methyl ethyl ketone peroxide | 7 |
| Plus— | |
| Ethyl acetoacetate, 50/50 | 2 |
| Ethyl benzoylacetate, 50/50 | 3 |
| Tert-butyl percyclohexanecarboxylate | 3 |
| Plus 2,4-pentanedione, 50/50 | 1 |

EXAMPLE 23

The standard resin and method of Example 1 but containing the concentration of cobalt salt and enolizable ketone as indicated:

1% Methyl ethyl ketone peroxide

| Cobalt octoate | | Percent | Gel time, min. |
|---|---|---|---|
| 0.05% | Ethyl benzoylacetate | 0.0 | 39 |
| 0.05% | do | 0.4 | 30 |
| 0.05% | do | 1.0 | 23 |

0.25% heptaldehyde peroxide

| 0.05% | 2,4-pentanedione | 0 | 55 |
| 0.05% | do | 1.0 | 26 |

1% p-menthane hydroperoxide

| 0.05% | 2,4-pentanedione | 0 | ¹ 26 |
| 0.05% | do | 1.0 | ¹ 15 |

1% tert-butyl percyclohexanecarboxylate

| 0.05% | 2,4-pentanedione | 0 | ¹ 10 |
| 0.05% | do | 1.0 | ¹ 8 |

0.4% 2,5-di-(p-toluylperoxy)-2,5-dimethylhexane

| 0.05% | 2,4-pentanedione | 0 | ¹ 35 |
| 0.05% | do | 1.0 | ¹ 12 |

0.2% 2-hydroperoxy-5-(2-ethylhexanoylperoxy)-2,5-dimethylhexane

| 0.02% | 2,4-pentanedione | 0 | ¹ 52 |
| 0.02% | do | 1.0 | ¹ 28 |

¹ Time to peak of exotherm 185° F. min.

EXAMPLE 24

Compositions of the following peroxides and N,N-dimethylacetoacetamide were heated in an aging oven at 47° C.

| | Active oxygen content | |
|---|---|---|
| | Start | 12 days |
| Methyl ethyl ketone peroxide | 5.5% | (¹) |
| Tert-Butyl perbenzoate | 5.8% | 5.74% |

¹ Bottle broke before 1 day ended.

Time to peak exotherm as in Example 19 was determined on tert-butyl perbenzoate composition as follows:

Start: 17 min.—cured resin was orange
After 12 days at 47° C., 17 min.—cured resin was orange

I claim:
1. An initiator for the polymerization of ethylenically unsaturated compounds, said initiator consisting essentially of:
   (a) from about 1 to 99.97% by weight of an organic peroxide selected from the group consisting of: ketone peroxides of the formulae

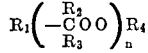

$n = 1-4$
$R_1 = $ —OH or —OOH
$R_2 = $ lower alkyl
$R_3 = $ —H, lower alkyl or alkoxycarbonyl
$R_2R_3 = $ pentamethylene
$R_4 = $ H or or

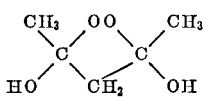

or
tertiary hydroperoxides of the formulae $R_1OOH$ $R_1 = $ tert-alkyl, tert cycloalkyl or tert-aralkyl or $R_2(OOH)_2$ $R_2 = $ di-tertiary substituted alkane
and tertiary organic peresters of the formulae

or

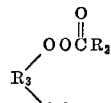

$R_1 = $ tert-alkyl
$R_2 = $ alkyl, cycloalkyl, aryl, or aralykyl
$R_3 = $ di-tertiary substituted alkane
$R_4 = $ —H or

(b) from about 0.03 to 99% by weight of an enolizable ketone selected from the formulae consisting of

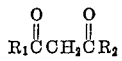

$R_1$ and $R_2 = $ alkyl, cycloalkyl, aryl, or alkaryl

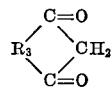

$R_3 = $ o-phenylene, trimethylene or B,B-dimethyltrimethylene

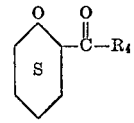

$R_4 = $ alkyl
and

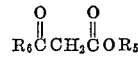

$R_5 = $ alkyl, cycloalkyl or aralkyl
$R_6 = $ phenyl, or methyl

2. The initiator of claim 1 wherein the organic peroxide is from 20 to 95% by weight and the enolizable ketone is from 5 to 80% by weight.
3. The initiator of claim 1 wherein the organic peroxide is a tert-organic hydroperoxide of the formulae:

$R_1OOH$ $R_1 = $ tert-alkyl, tert-cycloalkyl, or tert-aralkyl
or $R_2(OOH)_2$ $R_2 = $ di-tertiary substituted alkane
4. The initiator of claim 3 wherein the tertiary-organic hydroperoxide is selected from the group consistiong of: tert-butyl hydroperoxide and cumene hydroperoxide and the enolizable ketone is selected from the group consisting of 2,4-pentanedione and alkyl esters of acetoacetic acid.
5. The initiator of claim 4 wherein the enolizable ketone is 2,4-pentanedione.
6. The initiator of claim 1 wherein the organic peroxide is a ketone peroxide of the formulae:

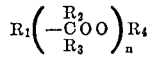

$n = 1-4$
$R_1 = $ —OH, or —OOH
$R_2 = $ lower alkyl
$R_3 = $ —H, lower alkyl, or alkoxycarbonyl
$R_2R_3 = $ pentamethylene $R_4=$—H, or

or

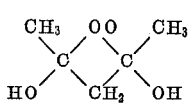

7. The initiator of claim 6 wherein the organic peroxide is selected from the group consisting of methyl ethyl ketone peroxide, cyclohexanone peroxide, bis(1-hydroxycyclohexyl-1) peroxide and ethyl 3-hydroxy-3-hydroperoxybutyrate, and the enolizable ketone is selected from the group consisting of 2,4-pentanedione and alkyl esters of acetoacetic acid.

8. The initiator of claim 6 wherein the organic peroxide is 3,5-dimethyl-3,5-dihydroxy-1,2-peroxycyclopentane and the enolizable ketone is 2,4-pentanedione.

9. The initiator of claim 7 wherein the organic peroxide is selected from the group consisting of methyl ethyl ketone peroxide and cyclohexanone peroxide and the enolizable ketone is selected from the group consisting of 2,4-pentanedione and alkyl esters of acetoacetic acid.

10. The initiator of claim 9 wherein the enolizable ketone is selected from the group consisting of 2,4-pentanedione, methyl acetoacetate and ethyl acetoacetate.

11. The initiator of claim 10 wherein the organic peroxide is methyl ethyl ketone peroxide.

12. The initiator of claim 11 wherein the enolizable ketone is 2,4-pentanedione.

13. The initiator of claim 1 wherein the organic peroxide is a tert-alkyl perester of the formulae:

or

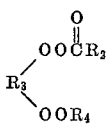

$R_1=$tert-alkyl
$R_2=$alkyl, cycloalkyl, aryl, or aralkyl
$R_3=$di-tertiary substituted alkane
$R_4=$—H, or

14. The initiator of claim 13 wherein the enolizable ketone is selected from the group consisting of 2,4-pentanedione, acetylbenzoylmethane, dibenzoylmethane, 5,5-dimethyl-1,3-cyclohexanedione, 1,3-cyclohexanedione, and alkyl esters of acetoacetic acid.

15. The initiator of claim 14, wherein the tert-alkyl perester is selected from the group consisting of tert-butylperbenzoate 2,5-dibenzoylperoxy-2,5-dimethylhexane, 2,5-dioctanoylperoxy-2,5-dimethylhexane, 2,5-di(2-ethylhexanoylperoxy) - 2,5 - dimethylhexane, tert-butyl per-2-ethyl hexanoate, and tert-butyl peroctanoate.

16. The initiator of claim 15 wherein the enolizable ketone is 2,4-pentanedione.

17. The initiator of claim 16 wherein the tert-alkyl perester is tert-butyl perbenzoate.

18. The initiator of claim 16 wherein the tert-alkyl perester is 2,5-di(2-ethylhexanoylperoxy)-2,5-dimethylhexane.

19. The initiator of claim 16 wherein the tert-alkyl perester is 2,5-dioctanoylperoxy-2,5-dimethylhexane.

20. The initiator of claim 16 wherein the tert-alkyl perester is tert-butyl per-ethylhexanoate.

21. The initiator of claim 16 wherein the tert-alkyl perester is tert-butyl peroctanoate.

22. The initiator of claim 2 wherein the organic peroxide is a tertiary perester of the following formulae:

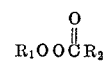

or

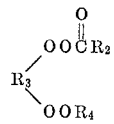

$R_1=$tert-alkyl
$R_2=$alkyl, cycloalkyl, aryl, or aralkyl
$R_3=$di-tertiary substituted alkane
$R_4=$—H, or

and the enolizable ketone is selected from the group consisting of 2,4-pentanedione and alkyl esters of acetoacetic acid.

23. The initiator of claim 22 wherein the perester is tert-butyl perbenzoate and the enolizable ketone is 2,4-pentanedione.

24. An initiator for the polymerization of ethylenically unsaturated compounds consisting essentially of:

(a) from about 20 to 95% by weight of a perester of the formulae:

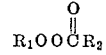

or

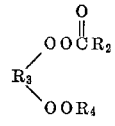

$R_1=$tert-alkyl
$R_2=$alkyl, cycloalkyl, aryl, or aralkyl
$R_3=$di-tertiary substituted alkane
$R_4=$—H, or

(b) from about 5 to 80% by weight of an enolizable ketone selected from the group consisting of N,N-dimethylacetoacetamide and N,N-diethylacetoacetamide.

References Cited
UNITED STATES PATENTS

| | | | |
|---|---|---|---|
| 2,895,919 | 7/1959 | Gerhart | 252—428 X |
| 2,933,475 | 4/1960 | Hoover et al. | 260—439 X |
| 3,333,021 | 7/1967 | Geipert | 252—431 C X |
| 3,377,407 | 4/1968 | Kressin et al. | 252—426 X |

PATRICK P. GARVIN, Primary Examiner

U.S. Cl. X.R.

252—431, 431 C; 260—861, 863, 864